United States Patent
Schillaci et al.

(10) Patent No.: US 6,788,490 B2
(45) Date of Patent: Sep. 7, 2004

(54) CIRCUIT FOR ESTIMATING THE SPEED OF AN ELECTROMAGNETIC ACTUATOR

(75) Inventors: Luca Schillaci, Belgioioso (IT); Maurizio Nessi, Como (IT); Ezio Galbiati, Agnadello (IT)

(73) Assignee: STMicroelectronics S.r.l., Agrate Brianza (IT)

(*) Notice: Subject to any disclaimer, the term of this patent is extended or adjusted under 35 U.S.C. 154(b) by 357 days.

(21) Appl. No.: 10/097,638

(22) Filed: Mar. 14, 2002

(65) Prior Publication Data

US 2002/0149873 A1 Oct. 17, 2002

(51) Int. Cl.[7] .............................................. G11A 5/596
(52) U.S. Cl. .............................. 360/78.04; 360/78.05; 360/78.06; 318/561
(58) Field of Search ................... 360/75, 78.04, 360/78.05, 78.06, 77.02; 318/561, 560, 459, 590, 592, 254; 369/30.17, 43

(56) References Cited

U.S. PATENT DOCUMENTS 4,691,152 A   9/1987   Ell et al. ................... 318/616
6,392,375 B1 * 5/2002   Portaluri et al. ........... 318/459

* cited by examiner

Primary Examiner—Andrew L. Sniezek
(74) Attorney, Agent, or Firm—Lisa K. Jorgenson; Allen, Dyer, Doppelt, Milbrath & Gilchrist, P.A.

(57) ABSTRACT

A circuit estimates speed of an electromagnetic actuator associated with a reading head of a disk storage unit and a digital controller. The circuit includes first and second supply terminals and an output terminal, with the first supply terminal being connected to the electromagnetic actuator. A measuring resistor is connected to the second supply terminal, and is connected in series with the electromagnetic actuator for measuring a current which passes therethrough when a supply voltage is applied between the first and second supply terminals. An adder has an output connected to the output terminal for providing an output voltage, a first input is connected to the first supply terminal, and a second input is connected to the second supply terminal. An adjustable-gain amplifier is connected between the measuring resistor and the second input of the adder for transferring the supply voltage and a voltage across the measuring resistor to the adder. A determination circuit is connected to the adjustable-gain amplifier for determining a gain thereof. The determination circuit includes a coarse setting circuit and a fine calibration circuit controlled by the digital controller.

29 Claims, 4 Drawing Sheets

CIRCUIT FOR ESTIMATING THE SPEED OF AN ELECTROMAGNETIC ACTUATOR

FIELD OF THE INVENTION

The present invention relates to a circuit for estimating the speed of an electromagnetic actuator associated with a reading head of a disk storage unit.

BACKGROUND OF THE INVENTION

A disk storage device such as a hard disk, CD-ROM or DVD system comprises at least one disk on which data is stored or can be stored, a reading or reading/writing head mounted on a movable arm, and control circuits. The control circuits control an electric motor to rotate the disk about its axis and on an electromagnetic actuator of the type known as a voice coil motor (VCM) for moving the arm radially over the disk so as to position the head over predetermined points on the surface of the disk.

During the normal operation of the device, the head moves over the disk without touching it, supported by air-currents generated by the rotating disk. In some conditions, for example, when reading/writing operations are not to be performed, or when the energy supply to the device is removed, the head is brought to a parked position outside the surface of the disk. This position is typically defined by a ramp onto which the head is loaded (ramp loading), or from which the head is unloaded (ramp unloading).

For head loading operations it is important to apply to the actuator a voltage which is just sufficient to bring the head to the parked position, taking account of the power losses due to friction and leakages. This operation is particularly critical because it is often performed during the switching-off of the device when little electrical energy is available.

The unloading operation, that is, the downward movement of the head from the ramp, is perhaps even more important. In this case, the movement of the head has to be as quick as possible to permit prompt reading/writing of the data, but the head must definitely be prevented from coming into contact with the disk.

To perform the loading and unloading operations correctly, particularly the unloading operation, the speed of the head must be completely controlled in a manner such that the energy supplied to the device is that which is necessary and sufficient for the operation to be performed at every moment.

The instantaneous speed of the head can be estimated by analyzing electrical characteristics of the VCM actuator. The actuator is formed substantially by a coil fixed to the movable arm which carries the head, and by one or more fixed magnets which create a magnetic field that extends through the coil. When a current flows through the coil, a corresponding magnetic force is generated and moves the head relative to the fixed magnet in order to position the head over a predetermined point of the disk.

When the coil cuts the field lines during its movement, a back electromotive force (Vbemf) is generated, which varies based upon the speed of the head. The Vbemf can therefore be measured to make an estimate of the speed. To take a measurement of the Vbemf when a current is flowing through the coil, it is possible to measure the current with a resistor Rs placed in series with the coil, and to take account both of the resistance of the measuring resistor and of the internal resistance Rm of the coil.

According to a known method, the Vbemf is estimated by subtracting the voltage drops in the resistors Rm and Rs from the voltage controlling the VCM actuator. The regulation circuit is calibrated in a manner such that, when the actuator is stationary, the output of the circuit is 0.

A known circuit for controlling a VCM electromagnetic actuator is shown in FIG. 1. A VCM 10 is represented by an inductor Lm (the inductance of the actuator coil), a resistor Rm (the resistance of the coil) and a generator of a voltage Vbemf (the back electromotive force), which are connected in series. The VCM 10 is supplied by a bridge power amplifier represented by two operational amplifiers 11 and 12 with gains of G and -G, respectively. A resistor Rs is connected in series with the VCM 10 to provide a voltage signal proportional to the current passing through the VCM at the input of a measuring amplifier 13 with a gain Gs.

A control voltage Vp−Vm is applied to the bridge amplifier by an error amplifier 14 having a non-inverting input connected to a reference voltage terminal, represented by the ground symbol. An inverting input is connected to a control circuit which supplies it with an analog voltage Vin through a series input resistor R1. The control circuit is formed by a digital controller 15 and by a digital/analog converter 16. The output and the inverting input of the error amplifier 14 are connected to one another by a resistor Rc in series with a compensation capacitor Cc. The output of the measuring amplifier 13 is connected to the inverting input of the error amplifier 14 through a feedback resistor R2.

In operation, a signal containing information relating to the desired position for the head is applied to the error amplifier 14 as a voltage Vin. The bridge amplifier 11, 12 is controlled by the output voltage of the error amplifier 14 and supplies to the VCM 10 a controlled current I which brings the head precisely to the desired position.

The following equation is used to find the speed of the head:

$$Vp-Vm=Vbemf+(Rs+Rm)*I+L*dI/dt$$

With the VCM 10 in a constant current condition, this equation provides:

$$Vbemf=Vp-Vm-Rs*I*(1+Rm/Rs)$$

The Vbemf, and hence the speed of the head, can be estimated precisely if the ratio Rm/Rs is known. The resistance Rs can be determined precisely by selecting a precision resistor which is substantially not sensitive to variations in the operating conditions. However, the resistance Rm, that is, the internal resistance of the VCM, varies with the type of device used at any particular time, and once the actuator has been selected, also varies considerably with the operating temperature (up to 30% by the typical value). The circuit for measuring the Vbemf has to be calibrated accurately to take account of these variations.

A known circuit for estimating the speed of an electromagnetic actuator is shown in FIG. 2. A VCM actuator 10 in series with a measuring resistor Rs are connected between the supply terminals P and M of a bridge power amplifier such as that of FIG. 1, which is not shown in order to not make the drawing unnecessarily complex.

The circuit is formed substantially by an adder, which is formed by an operational amplifier 20 and by a resistive network. More particularly, a resistor 21 with a resistance of R is connected between the terminal P and the non-inverting terminal of the amplifier 20. A resistor 22, also with a resistance of R, is connected in parallel with a resistor 23 of variable resistance Ra to the node S between the resistor Rs and the VCM 10 at one end, and to the inverting terminal of the amplifier 20 at the other end. The output of the amplifier 20 is connected to its inverting input by a resistor 24 with a resistance of Rb.

The non-inverting terminal of the amplifier 20 is also connected, by a variable resistor 25 with a resistance of Ra' to the terminal M, and by a resistor 26 with a resistance of Rb to a source of a constant reference voltage Vref. The output of the amplifier 20 is connected to the digital controller 15 via an analog/digital converter 27. If the variable resistors Ra and Ra' are calibrated correctly, the circuit shown supplies to the controller 15 a signal which depends solely on the Vbemf, and hence on the speed of the head. To calibrate the resistors, the controller 15 measures the voltage between the terminals P and M when the head is stationary, and adjusts the resistors in a manner such that the output of the circuit is at the reference voltage Vref.

The circuit described above can provide precise speed data but has some disadvantages when the circuit has to be integrated in a semiconductor chip with the smallest possible dimensions. The production of the variable resistors Ra and Ra' is in fact quite difficult and expensive in terms of area of the integrated circuit because the calibration range has to be quite large.

SUMMARY OF THE INVENTION

In view of the foregoing background, it is therefore an object of the present invention to provide a circuit for estimating the speed of an electromagnetic actuator which does not require an extensive area of the integrated circuit, which is precise, and which is very versatile, i.e., which can be used without modifications, even with electromagnetic actuators which are very different from one another.

This and other objects, advantages and features according to the present invention are provided by a circuit for estimating speed of an electromagnetic actuator associated with a reading head of a disk storage unit and a digital controller. The circuit includes first and second supply terminals and an output terminal, and the first supply terminal is connected to the electromagnetic actuator. A measuring resistor is connected to the second supply terminal, and is connected in series with the electromagnetic actuator for measuring a current which passes therethrough when a supply voltage is applied between the first and second supply terminals.

The circuit preferably further comprises an adder having an output connected to the output terminal for providing an output voltage corresponding to an estimated speed of the electromagnetic actuator, a first input connected to the first supply terminal, and a second input connected to the second supply terminal. A transfer circuit is preferably connected between the first and second supply terminals and the first and second inputs of the adder for transferring to the adder in predetermined voltage proportions and with a predetermined sign the supply voltage and a voltage across the measuring resistor.

The transfer circuit may comprise a calibration circuit connected between the measuring resistor and the second input of the adder. The calibration circuit may be controlled by the digital controller for determining the predetermined voltage proportions so that the output voltage is substantially proportional to a back electromotive force generated by the electromagnetic actuator.

The calibration circuit comprises an adjustable-gain amplifier, and a determination circuit connected to the adjustable-gain amplifier for determining a gain thereof. The determination circuit preferably comprises a coarse setting circuit and a fine calibration circuit controlled by the digital controller.

The coarse setting circuit may comprise a constant reference voltage source, and a resistive voltage divider connected to the constant reference voltage source for deriving a coarse voltage setting. The fine calibration circuit may comprise a plurality of resistors connected in series for defining a plurality of voltage steps for adjusting the coarse voltage setting based upon a digital control signal from the digital controller for generating an adjustable control signal for said adjustable-gain amplifier. The adjusting may comprise at least one of adding and subtracting the voltage steps to the coarse voltage setting.

The determination circuit preferably further comprises a multiplexer connected between the plurality of resistors and the digital controller. The multiplexer has an input receiving the digital control signal and an output providing the adjustment control signal.

Another aspect of the present invention is directed to a method for estimating speed of an electromagnetic actuator using a measuring resistor connected in series therewith. The electromagnetic actuator and the measuring resistor are connected between first and second supply terminals. The method preferably comprises applying a supply voltage across the first and second supply terminals, measuring a current passing through the electromagnetic actuator, and transferring the supply voltage and a voltage across the measuring resistor to an adder for providing an output voltage corresponding to an estimated speed of the electromagnetic actuator.

The transferring may comprise adjusting a gain of an adjustable-gain amplifier connected between the measuring resistor and the adder. The adjusting may comprise deriving a coarse voltage setting, and adjusting the coarse voltage setting based upon a digital control signal for generating an adjustment control signal for adjusting the gain of the adjustable-gain amplifier.

BRIEF DESCRIPTION OF THE DRAWINGS

The invention will be better understood from the following detailed description of an embodiment thereof described by way of a non-limiting example with reference to the appended drawings, in which.

DETAILED DESCRIPTION OF THE PREFERRED EMBODIMENTS

Figure 1:
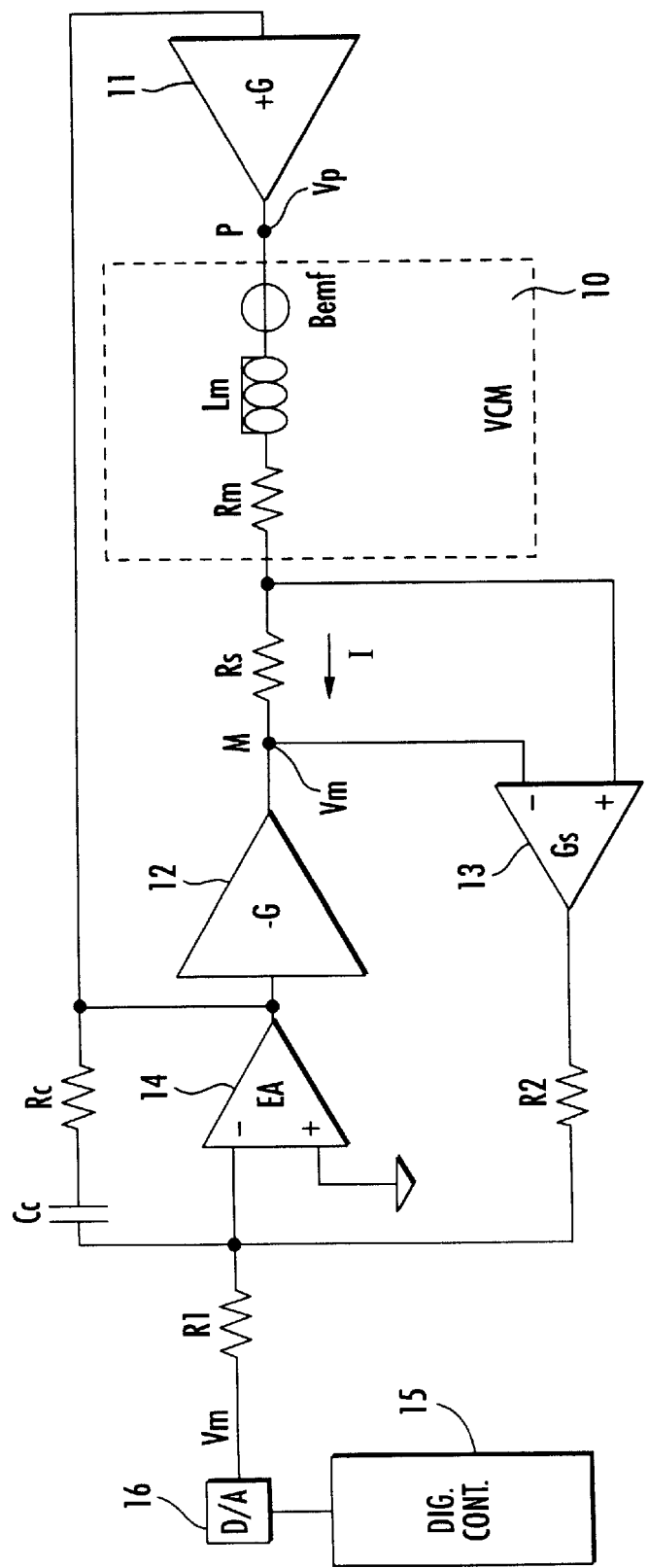
FIG. 1 shows a circuit for controlling an electromagnetic actuator according to the prior art.
Figure 2:
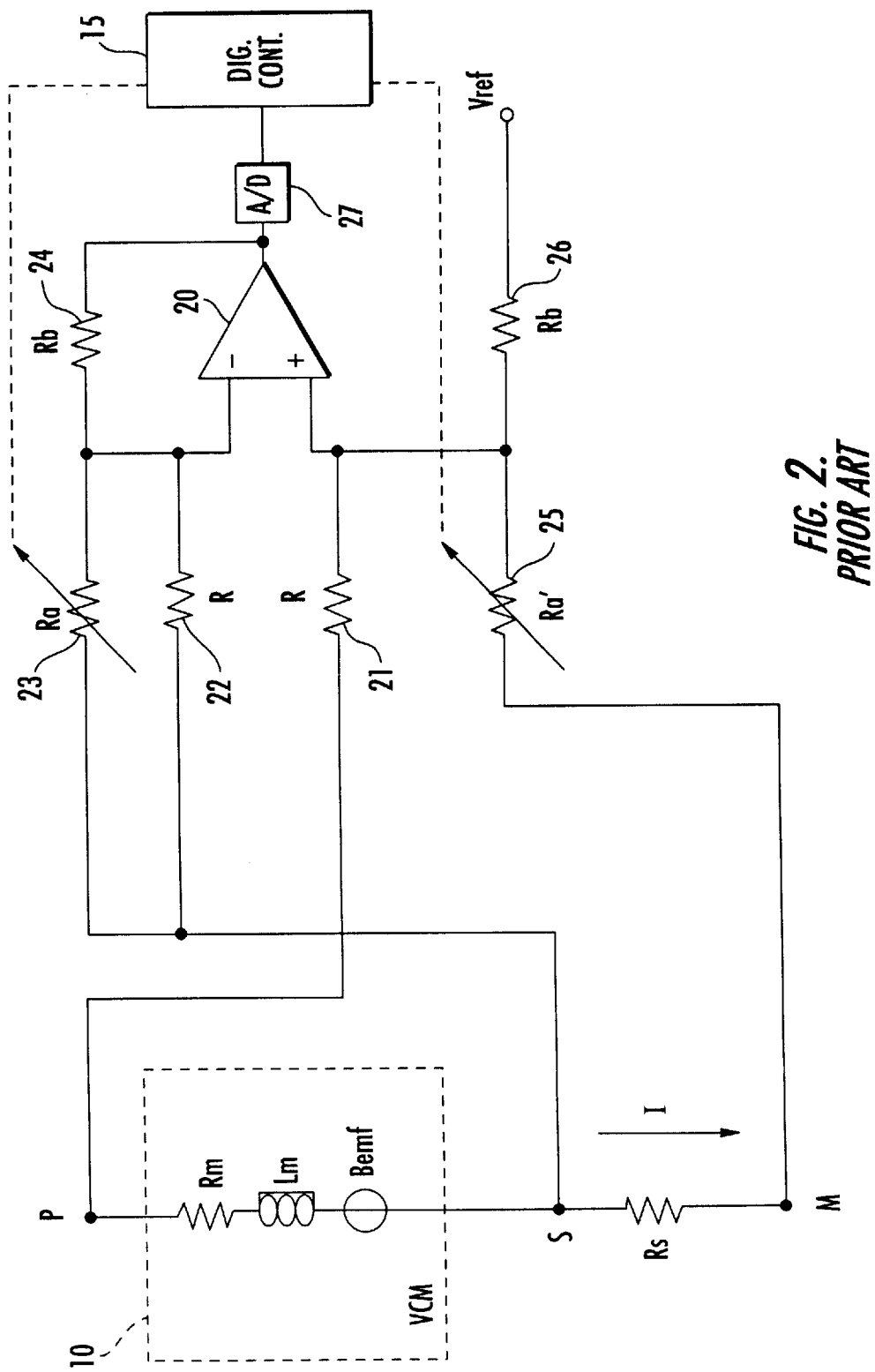
FIG. 2 shows a circuit for estimating the speed of an electromagnetic actuator according to the prior art.
Figure 3:
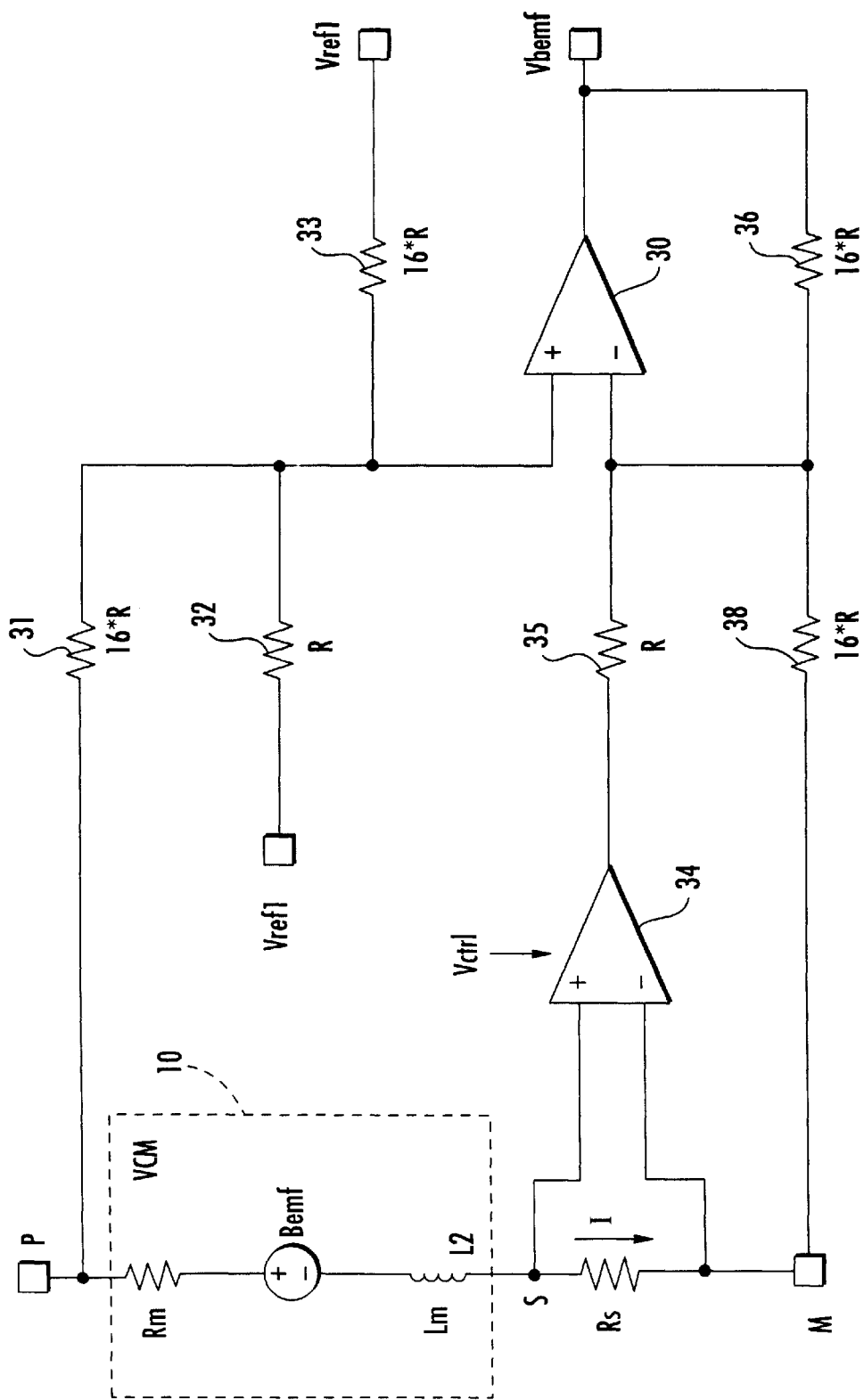
FIGS. 3 and 4 show two portions of a circuit for estimating the speed of an electromagnetic actuator according to an embodiment of the present invention.

With reference to FIG. 3, a VCM actuator 10 and a current-measuring resistor Rs are connected in series between two terminals P and M of a bridge amplifier, such as that of FIG. 1. An operational amplifier 30 is connected to the terminals P and M and to the resistor Rs in a manner such as to add together a voltage proportional to a control voltage Vp–Vm applied between the terminals P and M, and a voltage proportional to the drop across the resistor Rs.

More precisely, the non-inverting terminal of the amplifier 30 is connected to the terminal P by a resistor 31 with a resistance of 16*R and to a source of a constant reference voltage Vref1, through two resistors 32 and 33 in parallel, with resistances of R and 16*R, respectively. As will be clear to one skilled in the art, instead of the two resistors 32 and 33 it would be possible to have only one resistor with a resistance equal to the resistance of the resistors 32 and 33 in parallel. However, the representation selected is useful for illustrating the preferred dimensional relationship between the various resistances of the circuit.

The inverting input of the amplifier 30 is connected to the terminal M by a resistor 38 with a resistance of 16*R, to the output of a differential amplifier with adjustable gain 34 by a resistor 35 with a resistance of R, and to the output of the amplifier 30 by a resistor 36 with a resistance of 16*R. The input terminals of the amplifier 34 are connected to the terminals S and M of the resistor Rs.

As can be confirmed from the ratio between the resistances of the resistors 36 and 35, the gain of the amplifier 30 in this embodiment is set at 16. The resistance of the resistors of the circuit and the reference voltage Vref1 are selected in a manner such that, at the output of the circuit, there is a voltage which is centered on the value of the reference voltage Vref1. This voltage is proportional to the difference between the voltage between the terminals P and M and the output voltage of the amplifier 34 multiplied by 16.

If the gain of the amplifier 34 is made to vary between 0 and 4 by a voltage Vctr1 applied to its regulation terminal, the overall gain of the circuit, seen by the measuring resistor Rs, can vary between 0 and 64. The circuit is calibrated by adjusting the gain of the amplifier 34, and more precisely, by selecting the gain for which there is a voltage equal to Vref1 at the output of the circuit when the head of the actuator is stationary.

According to the invention, a coarse adjustment of the gain is performed by a resistive divider formed by two precision resistors 41 and 42 (FIG. 4) outside the integrated circuit, and which are connected to a source of a predetermined and constant voltage Vref2. The resistors are selected keeping in mind the resistance of the coil of the VCM which is to be used, and more precisely, in a manner such that the voltage at the intermediate tap of the divider regulates the gain of the amplifier 34. This is done in a manner such that, with the VCM used and the actuator stationary in average operating conditions, the output voltage of the circuit is equal to or very close to Vref1.

Figure 4:
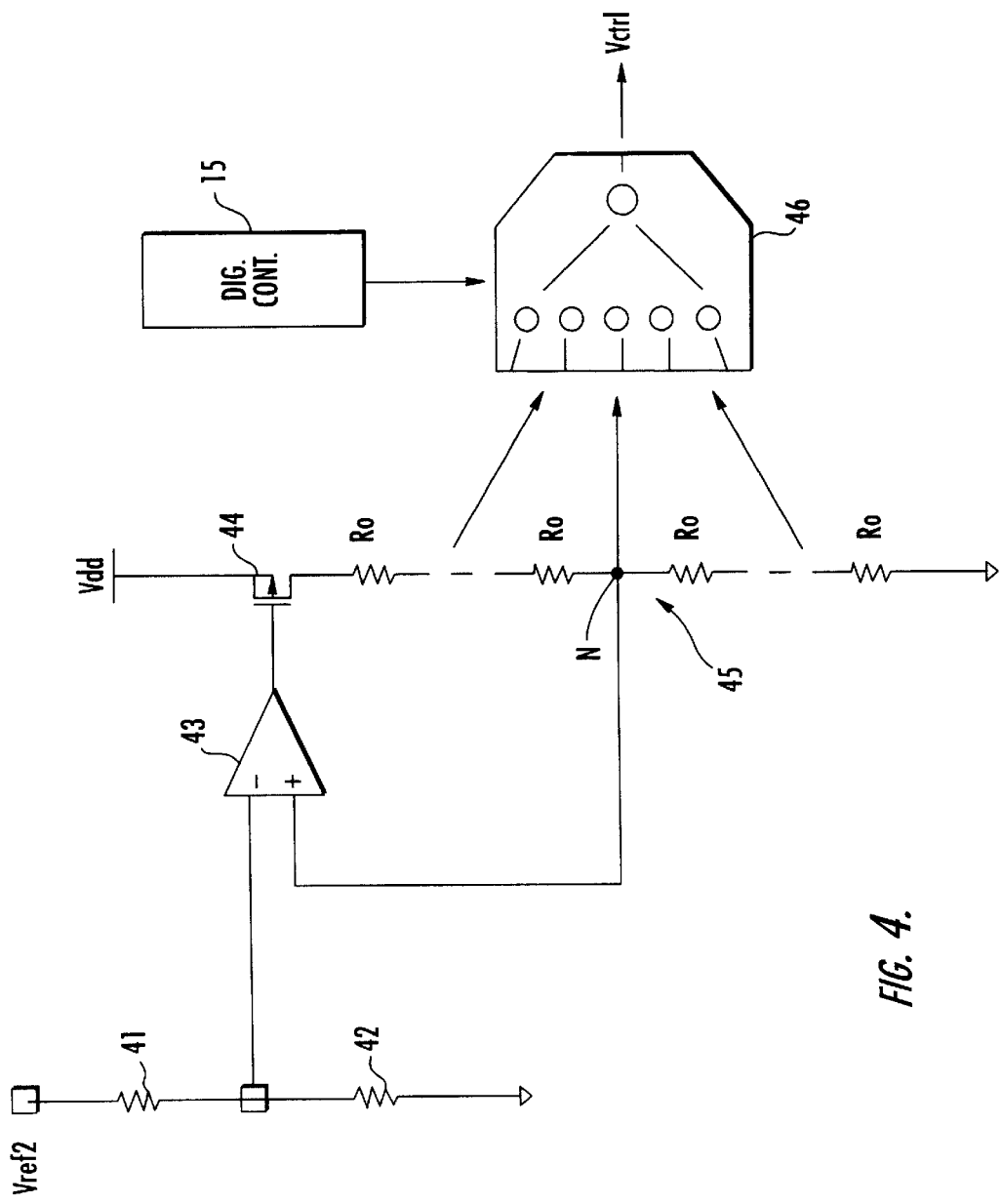

The intermediate tap of the divider is connected to the inverting input of an operational amplifier 43, the output of which is connected to the gate terminal of a p-channel MOS transistor 44. As shown in FIG. 4, the transistor 44 has its source terminal connected to the positive terminal Vdd of a supply, and its drain terminal connected to ground by a chain 45 of n (for example, 16) resistors of equal resistance Ro. The non-inverting terminal of the operational amplifier 43 is connected to the central node N of the chain of resistors 45.

As a result of the connection described, the voltage at the non-inverting terminal (and at the central node N of the chain) is equal to the voltage at the inverting terminal (and at the intermediate tap of the precision divider 41, 42). The n nodes of the chain 45 are connected to n corresponding inputs of a multiplexer 46, the output of which is connected to the regulation terminal of the amplifier with adjustable gain 34 (FIG. 3).

Connection between the input and the output of the multiplexer 46 is controlled by a digital signal applied to the control input of the multiplexer by the digital controller 15. If there are 16 resistors in the chain 45, a 4-bit signal suffices to select any one of the 16 possible connections between the input and the output of the multiplexer.

According to the invention, the regulation of the circuit for estimating the speed of the actuator is performed in two stages. In a first stage, a coarse setting is made on the basis of the nominal value of the resistance of the coil of the actuator selected for the specific application. This setting substantially includes selection of the reference voltage Vref2 and the two resistors 41 and 42 of the precision divider. The second stage is a fine calibration which is performed automatically by the digital controller 15 by a measurement of the Vbemf performed with the actuator stationary but with a current passing through it. In these conditions, the connection between the input and the output of the multiplexer 46 for which the Vbemf is zero is selected.

The circuit according to the invention is more versatile than known circuits because it can be used with a large variety of actuators which may even have resistances Rm which differ from one another considerably. Moreover, it does not require D/A converters which have a large number of bits and are therefore bulky, but only one D/A converter operating with a small number of bits.

In the embodiment described and illustrated, there is a single converter formed by the chain 45 of resistors and by the multiplexer 46, which although it is controlled by only 4 bits, ensures high precision because it operates within a small calibration range, that is, substantially only on that relating to the variability of the internal resistance of the actuator with temperature.

That which is claimed is:

1. A circuit for estimating speed of an electromagnetic actuator associated with a reading head of a disk storage unit and a digital controller, the circuit comprising:

first and second supply terminals and an output terminal, with the first supply terminal being connected to the electromagnetic actuator;

a measuring resistor connected to the second supply terminal, and connected in series with the electromagnetic actuator for measuring a current which passes therethrough when a supply voltage is applied between the first and second supply terminals;

an adder having an output connected to the output terminal for providing an output voltage corresponding to an estimated speed of the electromagnetic actuator, a first input connected to the first supply terminal, and a second input connected to the second supply terminal; and a transfer circuit connected between the first and second supply terminals and the first and second inputs of said adder for transferring to said adder in predetermined voltage proportions and with a predetermined sign the supply voltage and a voltage across said measuring resistor, said transfer circuit comprising a calibration circuit connected between said measuring resistor and the second input of said adder, said calibration circuit being controlled by the digital controller for determining the predetermined voltage proportions so that the output voltage is substantially proportional to a back electromotive force generated by the electromagnetic actuator, and said calibration circuit comprising
an adjustable-gain amplifier, and
a determination circuit connected to said adjustable-gain amplifier for determining a gain thereof, said determination circuit comprising a coarse setting circuit and a fine calibration circuit controlled by the digital controller.

2. A circuit according to claim 1, wherein said coarse setting circuit comprises:
- a constant reference voltage source; and
- a resistive voltage divider connected to said constant reference voltage source for deriving a coarse voltage setting.

3. A circuit according to claim 1, wherein said fine calibration circuit comprises a plurality of resistors connected in series for defining a plurality of voltage steps for adjusting a coarse voltage setting based upon a digital control signal from the digital controller for generating an adjustment control signal for said adjustable-gain amplifier.

4. A circuit according to claim 3, wherein the adjusting comprises at least one of adding and subtracting the voltage steps to the coarse voltage setting.

5. A circuit according to claim 3, wherein said determination circuit further comprises a multiplexer connected between said plurality of resistors and the digital controller, said multiplexer having an input receiving the digital control signal and an output providing the adjustment control signal.

6. A circuit according to claim 1, wherein said adder comprises an amplifier with a fixed gain.

7. A circuit according to claim 1, wherein said adjustable-gain amplifier comprises a differential amplifier having first and second inputs connected across said measuring resistor.

8. A circuit according to claim 1, wherein said transfer circuit further comprises:
- a first resistor between the first supply terminal and the first input of said adder; and
- a second resistor between the second supply terminal and the second input of said adder.

9. A circuit for estimating speed of an electromagnetic actuator associated with a reading head of a disk storage unit and a digital controller, the circuit comprising:
- first and second supply terminals and an output terminal, with the first supply terminal being connected to the electromagnetic actuator;
- a measuring resistor connected to the second supply terminal, and connected in series with the electromagnetic actuator for measuring a current which passes therethrough when a supply voltage is applied between the first and second supply terminals;
- an adder having an output connected to the output terminal for providing an output voltage corresponding to an estimated speed of the electromagnetic actuator, a first input connected to the first supply terminal, and a second input connected to the second supply terminal; and
- a transfer circuit connected between the first and second supply terminals and the first and second inputs of said adder for transferring to said adder the supply voltage and a voltage across said measuring resistor, said transfer circuit comprising
  - an adjustable-gain amplifier connected between said measuring resistor and the second input of said adder, and
  - a determination circuit connected to said adjustable-gain amplifier for determining a gain U thereof, said determination circuit comprising a coarse setting circuit and a fine calibration circuit controlled by the digital controller.

10. A circuit according to claim 9, wherein said transfer circuit transfers the supply voltage and the voltage across said measuring resistor in predetermined voltage proportions and with a predetermined sign; and wherein the digital controller determines the predetermined voltage proportions so that the output voltage is substantially proportional to a back electromotive force generated by the electromagnetic actuator.

11. A circuit according to claim 9, wherein said coarse setting circuit comprises:
- a constant reference voltage source; and
- a resistive voltage divider connected to said constant reference voltage source for deriving a coarse voltage setting.

12. A circuit according to claim 9, wherein said fine calibration circuit comprises a plurality of resistors connected in series for defining a plurality of voltage steps for adjusting the coarse voltage setting based upon a digital control signal from the digital controller for generating an adjustment control signal for said adjustable-gain amplifier.

13. A circuit according to claim 12, wherein said determination circuit further comprises a multiplexer connected between said plurality of resistors and the digital controller, said multiplexer having an input receiving the digital control signal and an output providing the adjustment control signal.

14. A circuit according to claim 12, wherein the adjusting comprises at least one of adding and subtracting the voltage steps to the coarse voltage setting.

15. A circuit according to claim 12, wherein said adjustable-gain amplifier comprises a differential amplifier having first and second inputs connected across said measuring resistor.

16. A circuit according to claim 12, wherein said transfer circuit further comprises:
- a first resistor between the first supply terminal and the first input of said adder; and
- a second resistor between the second supply terminal and the second input of said adder.

17. A circuit for estimating speed of an electromagnetic actuator, the circuit comprising:
- first and second supply terminals and an output terminal, with the first supply terminal being connected to the electromagnetic actuator;
- a measuring resistor connected to the second supply terminal, and connected in series with the electromagnetic actuator for measuring a current which passes therethrough when a supply voltage is applied between the first and second supply terminals;
- an adder having an output connected to the output terminal for providing an output voltage corresponding to an estimated speed of the electromagnetic actuator; a first input connected to the first supply terminal, and a second input connected to the second supply terminal;
- a transfer circuit connected between the first and second supply terminals and the first and second inputs of said adder for transferring to said adder the supply voltage and a voltage across said measuring resistor, said transfer circuit comprising
  - an adjustable-gain amplifier connected between said measuring resistor and the second input of said adder, and
  - a determination circuit connected to said adjustable-gain amplifier for determining a gain thereof, said determination circuit comprising
    - a coarse setting circuit comprising a resistive voltage divider connected between a first voltage reference and a second voltage reference for deriving a coarse voltage setting,
    - a fine calibration circuit connected to said coarse setting circuit and comprising a plurality of resistors connected in series between a third voltage reference and the second voltage reference, and a multiplexer connected to said plurality of resistors and having an input for receiving a digital control signal for adjusting the coarse voltage setting, and an output connected to said adjustable-gain amplifier providing an adjustment control signal thereto for adjusting the gain thereof.

18. A circuit according to claim 17, wherein said determination circuit further comprises a digital controller providing the digital control signal; and wherein said transfer circuit transfers the supply voltage and a voltage across said measuring resistor in predetermined voltage proportions and with a predetermined sign; and wherein said digital controller determines the predetermined voltage proportions so that the output voltage is substantially proportional to a back electromotive force generated by the electromagnetic actuator.

19. A circuit according to claim 17, wherein the first voltage reference comprises a constant reference voltage source; and said resistive voltage divider derives the coarse voltage setting therefrom.

20. A circuit according to claim 17, wherein said plurality of resistors define a plurality of voltage steps for adjusting the coarse voltage setting based upon the digital control signal.

21. A circuit according to claim 20, wherein the adjusting comprises at least one of adding and subtracting the voltage steps to the coarse voltage setting.

22. A circuit according to claim 17, wherein said adder comprises an amplifier with a fixed gain.

23. A circuit according to claim 17, wherein said adjustable-gain amplifier comprises a differential amplifier having first and second inputs connected across said measuring resistor.

24. A method for estimating speed of an electromagnetic actuator comprising:

connecting a measuring resistor in series with the electromagnetic actuator, and connecting the measuring resistor and the electromagnetic actuator between first and second supply terminals;

applying a supply voltage across the first and second supply terminals;

measuring a current passing through the electromagnetic actuator using the measuring resistor; and transferring the supply voltage and a voltage across the measuring resistor to an adder for providing an output voltage corresponding to an estimated speed of the electromagnetic actuator, the transferring comprising adjusting a gain of an adjustable-gain amplifier connected between the measuring resistor and the adder, the adjusting comprising deriving a coarse voltage setting, and adjusting the coarse voltage setting based upon a digital control signal for generating an adjustment control signal for adjusting the gain of the adjustable-gain amplifier.

25. A method according to claim 24, wherein deriving a coarse voltage setting is performed using a resistive voltage divider connected between a first voltage reference and a second voltage reference.

26. A method according to claim 25, wherein the first voltage reference comprises a constant reference voltage source; and wherein the resistive voltage divider derives the coarse voltage setting therefrom.

27. A method according to claim 24, wherein adjusting the coarse voltage setting is performed using a fine calibration circuit connected to the coarse setting circuit, the fine calibration circuit comprising a plurality of resistors connected in series between a third voltage reference and a second voltage reference.

28. A method according to claim 27, wherein the digital control signal is provided to a multiplexer connected to the plurality of resistors, and an output of the multiplexer provides the adjustment control signal to the adjustable-gain amplifier.

29. A method according to claim 24, wherein the supply voltage and the voltage across the measuring resistor is transferred in predetermined voltage proportions and with a predetermined sign; and further comprising determining the predetermined voltage proportions so that the output voltage is substantially proportional to a back electromotive force generated by the electromagnetic actuator.

\* \* \* \* \*

UNITED STATES PATENT AND TRADEMARK OFFICE
CERTIFICATE OF CORRECTION

PATENT NO. : 6,788,490 B2
DATED : September 7, 2004
INVENTOR(S) : Luca Schillaci and Maurizio Nessi and Ezio Galbiati It is certified that error appears in the above-identified patent and that said Letters Patent is hereby corrected as shown below:

Title page,
Item [30], Foreign Application Priority Data, insert:
-- March 15, 2001 (EP) ...... --

Column 7,
Line 59, delete "gain U" insert -- gain --

Signed and Sealed this

Twenty-second Day of March, 2005

JON W. DUDAS
*Director of the United States Patent and Trademark Office*